United States Patent [19]

Maruyama

[11] Patent Number: 5,146,545
[45] Date of Patent: Sep. 8, 1992

[54] MEMORY DEVICE FOR A PAGE PRINTER
[75] Inventor: Michio Maruyama, Suwa, Japan
[73] Assignee: Seiko Epson Corporation, Tokyo, Japan
[21] Appl. No.: 422,931
[22] Filed: Oct. 17, 1989
[30] Foreign Application Priority Data
   Oct. 17, 1988 [JP] Japan .................. 63-260899
[51] Int. Cl.⁵ ............................................ G06K 15/00
[52] U.S. Cl. ...................................... 395/115; 395/110; 395/117
[58] Field of Search ................... 364/518-520, 364/235 MS File, 930 MS File; 340/730, 735, 750; 346/154; 395/101, 110, 117, 115, 116, 164, 165, 166, 150, 151

[56] References Cited
U.S. PATENT DOCUMENTS
   4,825,386 4/1989 Bogacki ................. 364/518

Primary Examiner—Arthur G. Evans
Attorney, Agent, or Firm—Blum Kaplan

[57] ABSTRACT

A memory device for a page printer utilizing a one port random access memory in connection with a central processing unit to process print data is provided. A first memory circuit is provided to receive head address data from the CPU. A second memory circuit receives tail address data from the CPU. The first memory circuit and second circuit store these input values. A first comparator compares the head address data stored in the first memory circuit with address data produced by the CPU, while a second comparator compares the tail address data stored in the second memory circuit with address data produced by the CPU. The memory is divided into a first region defined by the head address and the tail address and an other region. A memory control circuit receives the outputs from the second comparator and the first comparator and accesses one of the first region or the other region in response to the outputs of the comparators.

5 Claims, 7 Drawing Sheets

FIG. 8

| SIGNAL 138 | SET VALUE OF REGISTER 102 | MSB | OUTPUT OF 109 | | | | | | LSB |
|---|---|---|---|---|---|---|---|---|---|
| 1 | 0 | 1 | 1 | 1 | 1 | 1 | 1 | 1 | 1 |
| 1 | 1 | 0 | 1 | 1 | 1 | 1 | 1 | 1 | 1 |
| 1 | 2 | 0 | 0 | 1 | 1 | 1 | 1 | 1 | 1 |
| 1 | 3 | 0 | 0 | 0 | 1 | 1 | 1 | 1 | 1 |
| 1 | 4 | 0 | 0 | 0 | 0 | 1 | 1 | 1 | 1 |
| 1 | 5 | 0 | 0 | 0 | 0 | 0 | 1 | 1 | 1 |
| 1 | 6 | 0 | 0 | 0 | 0 | 0 | 0 | 1 | 1 |
| 1 | 7 | 0 | 0 | 0 | 0 | 0 | 0 | 0 | 1 |
| 0 | OPTIONAL | 1 | 1 | 1 | 1 | 1 | 1 | 1 | 1 |

FIG. 9

| SIGNAL 131 | SET VALUE OF REGISTER 103 | MSB | OUTPUT OF 110 | | | | | | LSB |
|---|---|---|---|---|---|---|---|---|---|
| 1 | 0 | 1 | 0 | 0 | 0 | 0 | 0 | 0 | 0 |
| 1 | 1 | 1 | 1 | 0 | 0 | 0 | 0 | 0 | 0 |
| 1 | 2 | 1 | 1 | 1 | 0 | 0 | 0 | 0 | 0 |
| 1 | 3 | 1 | 1 | 1 | 1 | 0 | 0 | 0 | 0 |
| 1 | 4 | 1 | 1 | 1 | 1 | 1 | 0 | 0 | 0 |
| 1 | 5 | 1 | 1 | 1 | 1 | 1 | 1 | 0 | 0 |
| 1 | 6 | 1 | 1 | 1 | 1 | 1 | 1 | 1 | 0 |
| 1 | 7 | 1 | 1 | 1 | 1 | 1 | 1 | 1 | 1 |
| 0 | OPTIONAL | 1 | 1 | 1 | 1 | 1 | 1 | 1 | 1 |

MEMORY DEVICE FOR A PAGE PRINTER

BACKGROUND OF THE INVENTION

The present invention relates generally to a memory device utilized in connection with a page printer which forms an image on a piece of paper by scanning a photosensitive drum with a light beam modulated in accordance with print data, and, in particular, to a single port memory device utilized with such a page printer.

Conventional page printers form images utilizing the principles of xerography. Such printers are capable of printing both characters and figures with a very high quality. To print both characters and figures on the same page in a mixed manner, data for printing characters and the data for printing images must be superimposed upon each other.

To superimpose characters, the page printer includes a memory and central processing unit ("CPU") as shown in FIG. 1. A CPU 200 operates to control the memory based upon a control program. A program ROM 201 stores the program for controlling printing steps. A font ROM 202 stores character pattern data. A memory control circuit 203 is coupled to CPU 200 and couples a two port image processing memory 204 to CPU 200. Image processing memory 204 stores image data so that print data can be processed in a bit by bit manner. A work memory 205 is also coupled to CPU 200 through memory control circuit 203. A parallel series converter 206 receives the data from imaging processing memory 204 and converts the parallel input into a bit unit output to be utilized by the printer.

When image data is stored in image processing memory 204, the character pattern data is read from font ROM 202 by CPU 200 and input to image processing memory 204 by memory control circuit 203. The image data and character pattern data are superimposed upon each other at high speeds by image processing memory 204. Further, the image processing memory is capable of processing the data in individual bit units and can shift the print data form in image processing memory 204 in bit units to finely adjust the printing positions at high speeds.

The conventional memory allows the print data to be processed in various ways. However, the image processing memory must be a two port memory having an input port and an output port which act independently of each other. Therefore, an expensive two port memory is required increasing the cost of the device. Further, the work memory, which is a one port memory, is of a different configuration than the image memory. This requires that the image processing memory and the work memory be operated as independent memories. Therefore, memory capacity which is not being used in either of the work memory or image processing memory can not be shared between the two memories, decreasing overall efficiency.

The conventional page printer forms images using very small dots enabling part of the image print data to be read and copied into another memory region within the overall memory. Such a copying process requires processing which does not allow the data to be affected by the data presently in the memory region being copied into the other region. Since the processing is carried out in software manner using a CPU, an extended period of time is required for the copy process preventing high speed printing performance of the page printer.

Accordingly, it is desired to provide a memory for a page printer which overcomes the disadvantages of the prior art devices described above and is capable of using a one port memory.

SUMMARY OF THE INVENTION

Generally speaking, in accordance with the present invention, an improved memory for a page printer is provided. A CPU processes print data. A one port random access memory ("RAM") is coupled to the CPU to act as a single main memory having data addresses therein. The memory is divided into regions. The data addresses having a first data address corresponding to the first data address in a data region and a last data address corresponding to the data address of the last data contained within the data region. A first memory circuit is coupled to the CPU by a data bus and receives the first data address from the CPU. A second memory circuit is coupled to the CPU by the data bus and receives the last data address from the CPU. The first memory circuit produces an output corresponding to the first memory address. A first comparator compares the first address data with address data input from said CPU. The second memory circuit produces an input corresponding to the last memory address. A second comparator compares the tail address data to address data received from the CPU.

Data is stored within the memory within the distinct regions. A gate receives the input from each comparator and allows access to either a first region specified by the first data address and last data address or in another region in response to inputs from the comparators. An image data processing region within the memory is determined by the first memory circuit and second memory circuit which divides the single one port memory into a work region and an image data processing region. The data from the work region is transferred to the image data processing region.

Accordingly, it is an object of this invention to provide an improved memory for a page printer.

Another object of this invention is to provide a single memory which may be divided into a work region and a data processing region in accordance with print data to more effectively utilize the memory.

A further object of the invention is to provide a memory device for a page printer utilizing a single one port RAM in conjunction with the CPU so that the single memory includes a work memory and image processing memory obtained by dividing the memory into regions.

Yet a further object of the invention is to provide a memory for a page printer which processes the data to be transferred in single bit units to allow high speed processing.

Still other objects and advantages of the invention will in part be obvious and will in part be apparent from the specification and drawings.

The invention accordingly comprises an apparatus embodying features of constructions, combinations of element and arrangement of parts which will be exemplified in the constructions hereinafter set forth and the scope of the invention indicated in the claims.

BRIEF DESCRIPTION OF THE DRAWINGS

For a fuller understanding of the invention, reference is had to the following description taken in connection with the accompanying drawings, in which:

FIG. 8 is a chart of the output of a step decoder of the masking circuit constructed in accordance with the invention;

FIG. 9 is a chart of the output of a second step decoder of the masking circuit constructed in accordance with the invention.

DETAILED DESCRIPTION OF THE PREFERRED EMBODIMENTS

Figure 1:
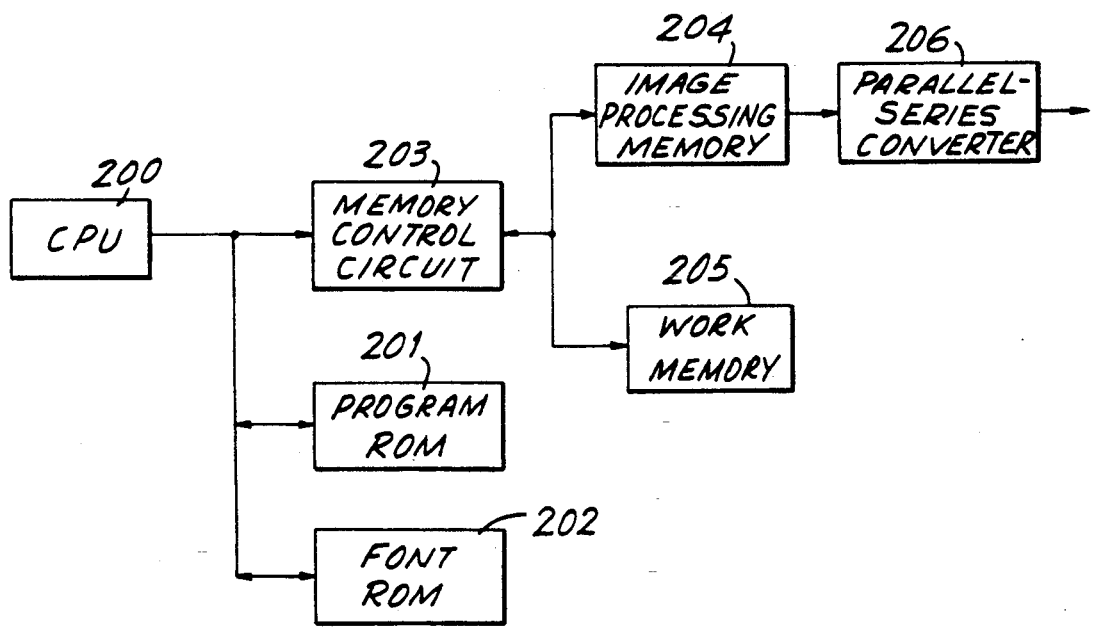
FIG. 1 is a block diagram of an image processor constructed in accordance with the prior art.
Figure 2:
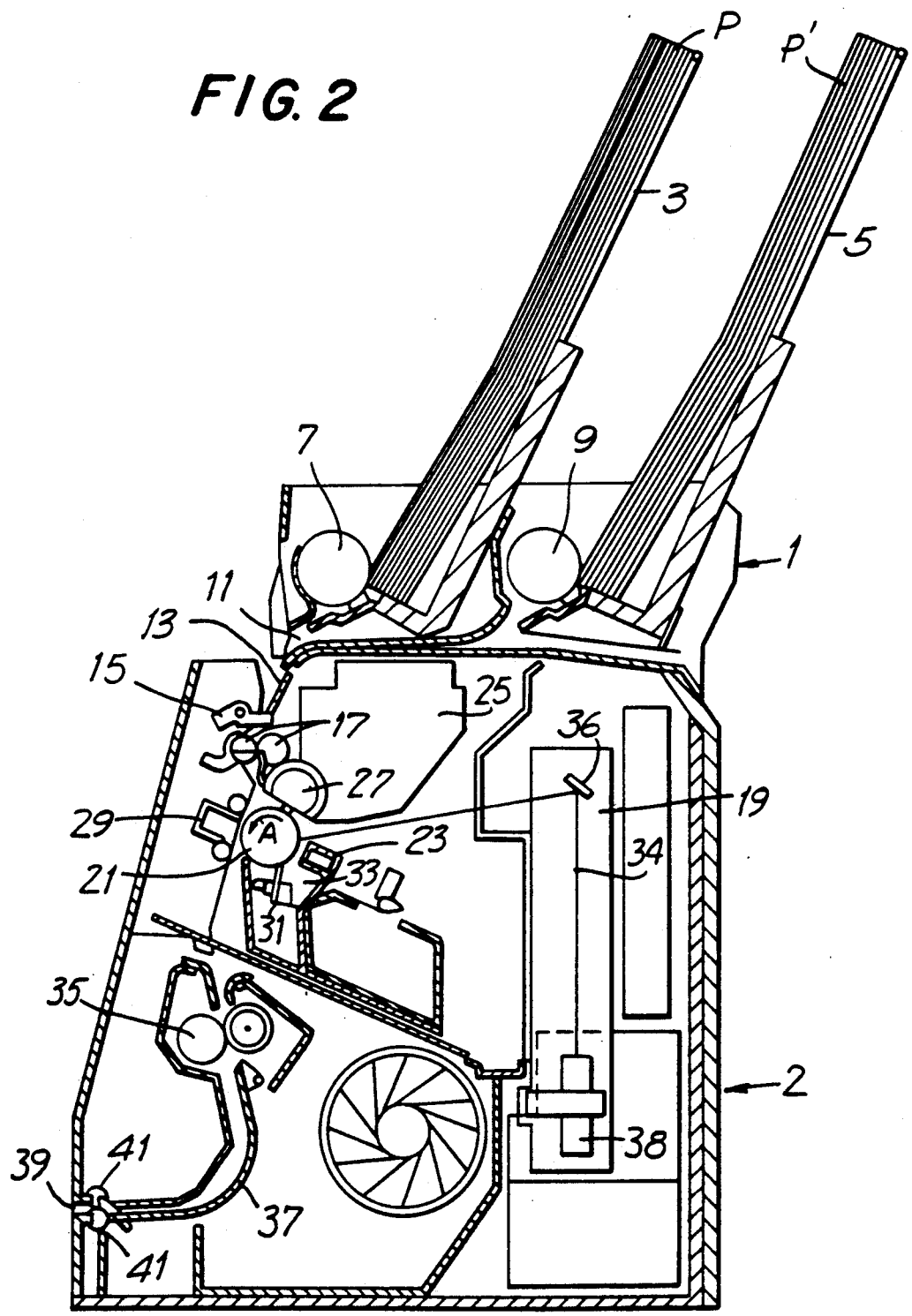
FIG. 2 is a sectional view of page printer which may be utilized in conjunction with a memory constructed in accordance with the present invention.

Reference is first made to FIG. 2 wherein a page printer for use in connection with a memory device constructed in accordance with the invention is provided. The page printer includes a page printer body 2. A paper feed 1 is detachably mounted on the page printer body 2. A first stacker 3 for stacking printing paper P is positioned within paper feed device 1. A second stacker 5 for stacking a different size paper P' is also positioned within feed device 1. A first pick-up roller 7 is positioned at the bottom of stacker 3 while a second pick-up roller 9 is positioned at the bottom of stacker 5. Pick-up rollers 7 and 9 remove printing paper P and P' respectively one sheet at a time from stackers 3 and 5. Printing papers P, P' are fed through a paper exit port 11 formed within paper feed device 1 to a paper feed port 13 formed in printer body 2. (For simplicity reference is made only to paper P.)

A paper detector 15 is disposed beneath paper feed port 15 and detects whether a sheet of paper P to be printed has been input. A pair of gate rollers 17 are positioned beneath paper detector 15 within printer body 2 to place the leading edge of paper sheet P at a predetermined position and feed it to the printing mechanism.

A photosensitive drum 21 is positioned downstream in the paper feeding direction from gate roller 17. Photosensitive drum 21 is arranged within page printer body 2 to rotate in the direction of arrow A to remove printing paper P downwards within printer body 2.

A light beam control mechanism 19 includes a light source 38 which projects a light beam 34 towards a mirror 36. Mirror 36 changes the path of light beam 34 to impinge on photosensitive drum 21 as photosensitive drum 21 rotates. An electrifying device 23 is provided about the periphery of photosensitive drum 21 to produce an electric charge on photosensitive drum 21. A toner sleeve 27 of a developing device 25 is positioned at the periphery of photosensitive drum 21 in the downstream rotation direction of photosensitive drum 21 relative to electrifying device 23 to affix toner to photosensitive drum 21. A transfer device 29, a transfer device 29, a toner recovering device 31 and an eraser 33 are each provided about the periphery of rotating photosensitive drum 21 in a downstream direction from toner sleeve 27. A fixing device 35 is arranged below photosensitive drum 21 by fix toner applied to photosensitive drum 21 to paper P.

A guide plate 37 is positioned beneath fixing device 35 to guide paper P towards a paper exit roller 41. Paper exit roller 41 removes printing paper P from guide plate 37 and out of page printer body 2 through an exit port 39.

If a print instruction is produced, printing paper P stacked in either of stackers 3, 5 of paper feed device 1 is fed out by pick-up roller 7, 9 respectively to paper feed port 13. The leading edge of paper P is positioned by gate roller 17. Printing paper P is further fed and bent to actuate paper detector 15. Paper detector 15 produces a signal causing gate rollers 17 to rotate in synchronism with the rotation of photosensitive drum 21. Gate rollers 17 feed paper P towards photosensitive drum 21.

Light beam control mechanism 19 receives print data from a memory and converts the data into a corresponding light beam 34. Light beam 34 is projected on photosensitive drum 21. Transfer device 29 effects image transfer by electrifying printing paper P so that toner on the surface of photosensitive drum 21 is attracted to printing paper P. The transferred toner adheres to printing paper P by thermal melting adhesion as printing paper P passes through fixing device 35. Printing paper P is then guided by paper guide 37 from fixing device 35 to exit rollers 41 and is discharged through paper exit port 39.

Figure 3:
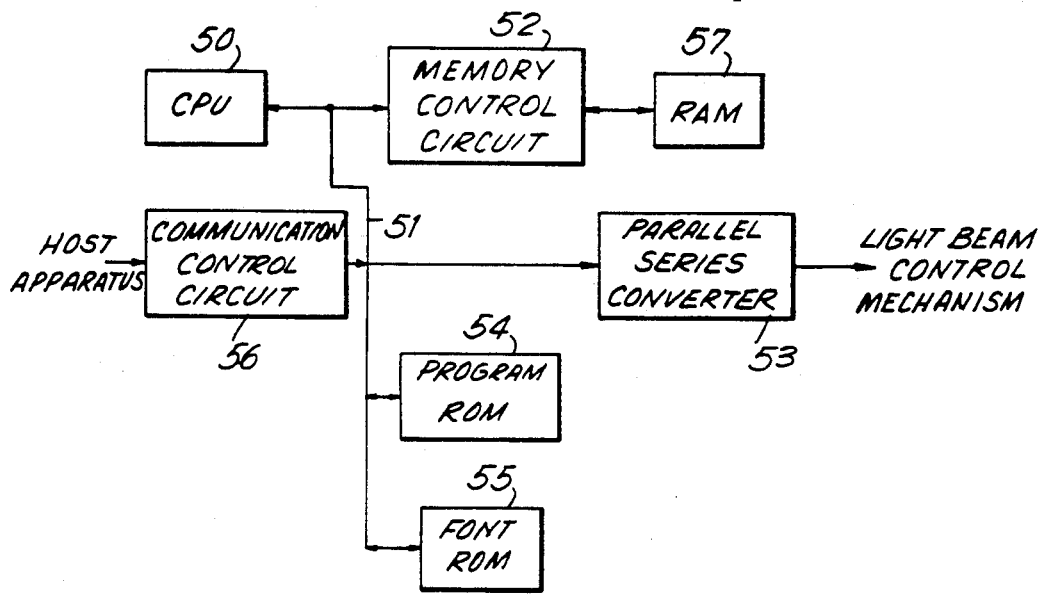
FIG. 3 is a block diagram of a memory device constructed in accordance with the invention.

Reference is now made to FIG. 3 in which a block diagram of a data processing apparatus used in connection with the page printer of FIG. 2 is provided. The data processing apparatus includes a CPU 50 which is constructed to continuously access memory space in a non-segmentation system. CPU 50 is coupled by a bus 51 to a memory control circuit 52, a parallel-series converter 53, a program ROM 54 for storing a work program and to a font ROM 55 which stores character pattern data. CPU 50 causes print data from a host apparatus to be sent through a communication control circuit 56 to an image data write mechanism such as light beam control mechanism 19 through parallel-series converter 53.

A one port random access memory 57 (hereinafter "memory") is coupled to CPU 50 through memory control circuit 52 which provides an image processing region and a work region within memory 57.

Figure 4:
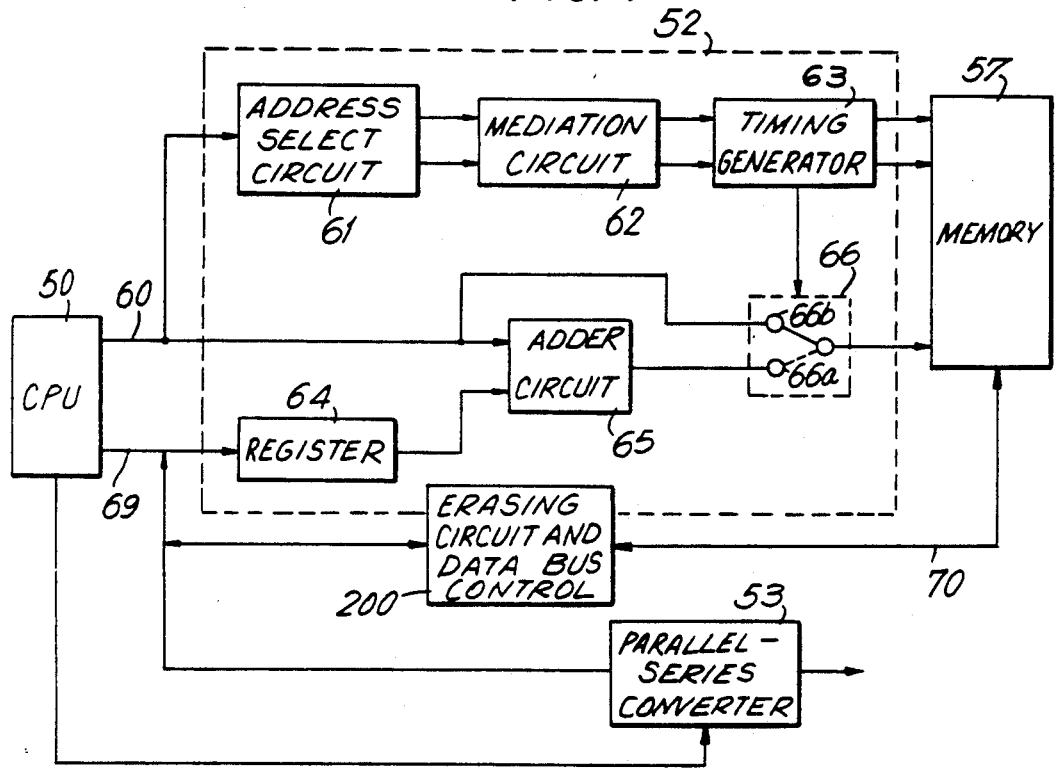
FIG. 4 is a block diagram of a memory control circuit constructed in accordance with the invention.

Reference is now made to FIG. 4, wherein a block diagram of a portion of memory control circuit 52 which constitutes the reading division circuit for dividing memory 57 into the work region and image data processing region is shown. Memory control circuit 52 includes an address select circuit 61 which defines a work region and an image processing region in accordance with an input along an address bus 60 from CPU 50. Address select circuit 61 produces image memory signals and work memory signals to variably maintain a storage capacity within memory 57 necessary for processing the image data. This allows for the use of only the amount of memory required for processing each specific image data as input. A mediation circuit 62 receives the work memory signals and image memory signals and determines the allotment of memory within memory 57 required for the image data processing region and the work region. A timing generator 63 upon receipt of a signal from mediation circuit 62 generates a timing signal that accesses the image data processing region and work region of memory 57.

A register 64 receives address data produced by CPU 50 along a data bus 69 and produces a signal. An adder circuit 65 receives the signal output by register 64 and adds that signal to the data signal produced by CPU 50 along address bus 60 and outputs an addition signal. An address select circuit 66 has a first terminal 66a which receives the addition signal of adder circuit 65. A second terminal 66b of address select circuit 66 receives the signal from address bus 60. Address select circuit 66 selects one of terminal of 66b or 66a in response to a signal from timing generator 63 and accesses memory 57 based upon the address which is selected Thus, image data read from memory 57 is output along a data bus 70 to a second data 69 bus which inputs to CPU 50. The data transmitted along data bus 69 is then input to parallel-series converter circuit 53 along a bus 69.

An erasing circuit and data bus control 200 is coupled to memory 57 by data bus 70. Erasing circuit and data bus control outputs an erasing signal along data bus 70 to erase previously input data in memory 57. Erasing circuit and data bus control 200 also controls the flow of data within data control circuit 52 and determines whether data should be fed from data bus 69 to data bus 70 or from data bus 70 to data bus 69.

Figure 5:
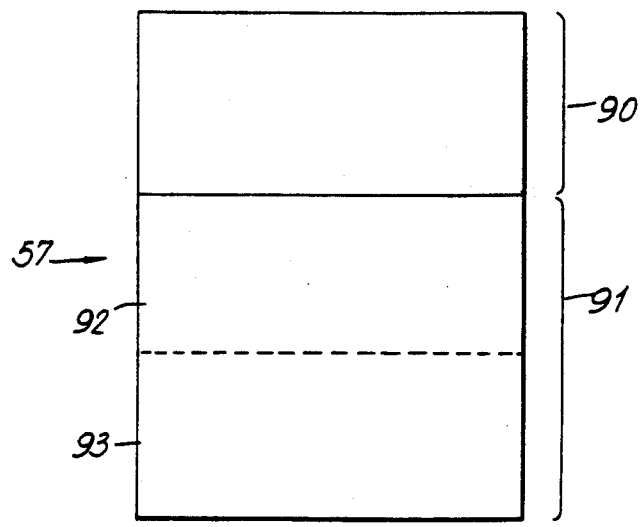
FIG. 5 is a schematic diagram of the structure of a memory utilized in accordance with the invention.

As can be seen in FIG. 5, memory 57 is divided into a work region 90 and an image data processing region 91. Image data processing region 91 is defined by at least two sub-regions 92, 93 each having storage capacities dimensioned to prevent the development of delays in printing steps within the page printer.

Figure 6:
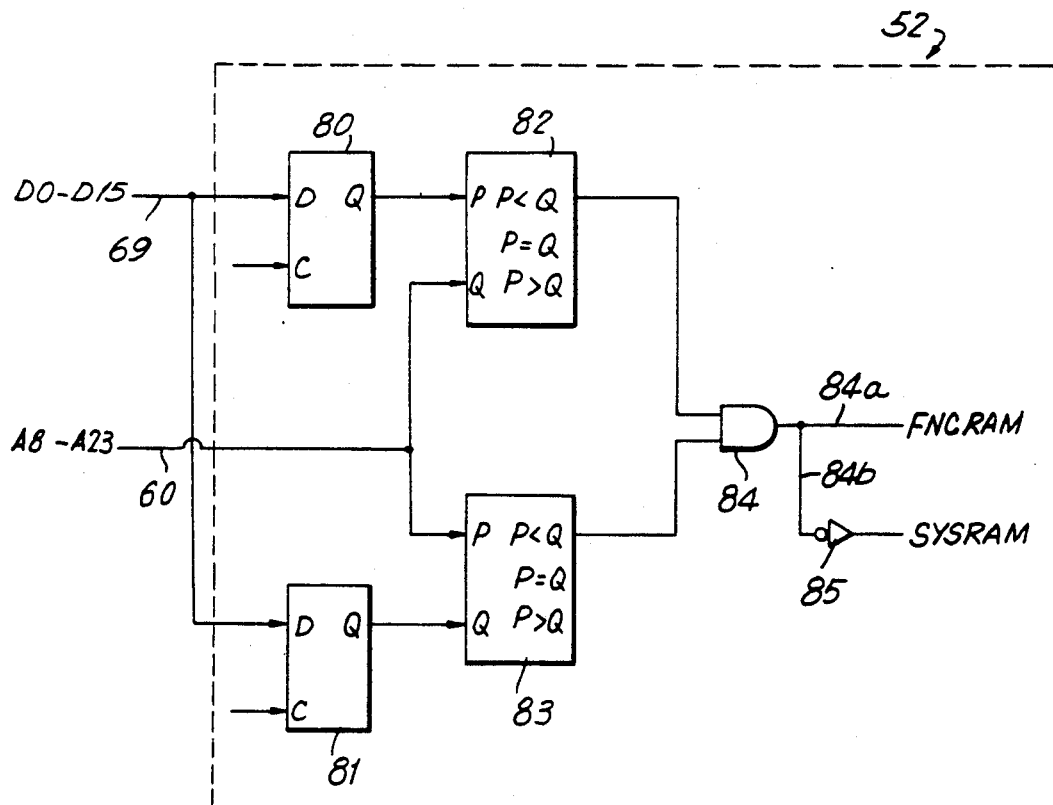
FIG. 6 is a circuit diagram of a circuit for dividing the memory into a work region and an image data processing region constructed in accordance with the invention.

Reference is now made to FIG. 6 in which a portion of the memory control circuit 52 responsible for dividing memory 57 into distinct regions is provided. Memory control circuit 52 includes a first memory circuit 80 and a second memory circuit 81. Each memory circuit receives the data transmitted along data bus 69 from CPU 50 at the respective D input of each. Each memory circuit 80, 81 also includes a C input for receiving a signal and sets the image data processing region. Each memory circuit 80, 81 produces a Q output of 1 when the data of the D terminal and the data of the C input correspond with each other. A lower limit value for the image region is input to the C input of memory circuit 80 to prevent destruction of the work region. Memory circuit 80 then receives, along data bus 69, the address of the first address of memory utilized for the image data processing region within memory 57 (hereinafter "head address"). Similarly, memory circuit 81 receives a lower limit value of the image processing region at its C input to prevent the work region from being destroyed and receives the address of the last portion of memory utilized for the image processing region of memory 57 (hereinafter "tail address") from data bus 69 at its D terminal.

A first comparator circuit 82 receives the output of first memory circuit 80 at a P terminal. Comparator circuit 82 receives address data produced by CPU 50 from address bus 60 at its Q input. Comparator circuit 82 produces a signal "1" when the data value input at the Q terminal is greater than the data value input at the P terminal (P<Q). First comparator 82 produces a signal "0" for the remaining situations. A second comparator circuit 83 receives the output of memory circuit 81 at its Q input and receives the address data transmitted along address bus 60 from CPU 50 at its P input.

Comparator circuit 83 produces a signal "1" when the data value at the Q input becomes greater than the data value at the P input (P<Q). Comparator circuit 83 produces a signal "0" when this relationship does not hold true.

The address of the image processing region is externally input by keyboard or the like to CPU 50 Upon receipt of the image processing region address, CPU 50 sends the address data to memory circuits 80, 81 along data bus 69. Then, first memory circuit 80 stores the head address of the image processing region and second memory circuit 81 stores the tail address of the image processing region. When the data input along address bus 60 is an address that deviates from the head address or the tail address input to memory circuit 80, 81, memory circuits 80, 81 produce signals halting operation of comparator circuits 82 and 83. On the other hand, when the address input from address bus 60 is within the preset input range, the address data from address bus 60 of CPU 50 is input to first and second comparator circuits 82 and 83 respectively. The address data is then compared with the address data stored in each of first memory circuit 80 and second memory circuit 81. When the input address data is within a range of data input to first memory circuit and second memory circuit 81, comparator circuits 82 and comparator circuit 83 each produce a signal "1" . An AND gate 84 receives the outputs of each comparator circuit 82, 83 and performs an AND operation on the signals produced by first comparator circuit 82 and second comparator circuit 83. When the inputs to the AND gate are both a signal "1" AND gate 84 produces a signal "1" that allows access to the image processing region of memory 57. On the other hand, when the address data input from address bus 60 lies outside the range of data stored within first memory circuit 80 and second memory circuit 81 at least one of comparator circuit 82 and 83 produce the signal "0", preventing access to the image processing region in memory 57.

The output terminal of AND gate 84 is branched along two routes 84a, 84b. Route 84a is directly coupled to an image data processing region accessible input of memory 57. Route 84b is connected to a work region accessible terminal of memory 57 through inverter 85. Therefore, when address data sent through address bus 60 is one that lies within the image data processing region, AND gate 84 produces a signal "1" which allows access to the image data processing region of memory 57. However, the signal "1" which is output by AND gate 84 is inverted by inverter 85 into a signal "0" preventing access to the work region of memory 57. On the other hand, when the address data transmitted along address bus 60 does not lie within a range of data stored in memory circuit 80, 81, comparator circuits 82 and 83 each produce signals "0". AND gate 84 produces a signal "0" which prevents access to the image processing region but is inverted by inverter 85 allowing access to the work region of memory 57.

Where a large capacity image data processing region is required to be maintained, the required capacity is instructed from an external data input means by means of a head address and a tail address of the data processing region. This address data is store in the first and second region memory circuits 80, 81 to maintain an image data processing capacity of the required capacity.

CPU 50 accesses the image data processing region of memory 57 through memory control circuit 52 in response to receipt of print data transfer request from light beam write control mechanism 19. Parallel-series converter circuit 53 detects a moment in which CPU 50 outputs address data through address bus 60 and reads the data on data bus 69 a predetermined time period later, after the data has been read from memory 57 by CPU 50. At this instant, data is output from memory 57 to CPU 50 along data bus 69.

Parallel-series converter circuit 53 latches the image data which is being transmitted in a parallel form through data bus 69 and converts the data into a serial signal. Parallel-series converter 53 then transmits the serial signal to light beam write control mechanism 19.

As noted above, when the data is being output from memory 57 through data bus 69 of CPU 50, parallel-series converter 53 latches the data being transmitted along data bus 69 without having to wait for the transfer of data through CPU 50. Therefore, serial data necessary for operating the page printer is quickly obtained. Thus, data can be transferred at high speed from a print data buffer to the page printer and the image data can be processed at high speed without using a two port memory.

Erasing circuit 200 (FIG. 4) monitors a moment in which the reading of first region 92 of image processing region 91 is completed and sends either signal "0" or a signal "1" to first region 92 when the read is completed. Accordingly, data which is no longer necessary may be successively erased from image processing region 91 without the need of waiting for an erase instruction from CPU. This allows erase processing at a high speed.

CPU 50 transfers the data stored in work region 90 to first region 92. When a next transfer is output by the page printer, CPU 50 enables address select circuit 61 to designate a head address within second region 93 so that the data of second region 93 is output onto data bus 69. The data on data bus 69 is in parallel form and is converted into serial data as noted above and then sent to the page printer.

As described above, data is transferred while allowing the changing of the capacity of the two sub-regions 92, 93 alternatively, saving memory capacity and allowing more efficient use of memory. An idle or unused region of memory formed by the memory capacity utilized for image data storage region is used for storing character code data input from the host equipment. When utilizing character code data which has been prestored in the memory, printing speed can be increased because it is no longer necessary to await for the transfer of data from the host equipment.

Figure 7:
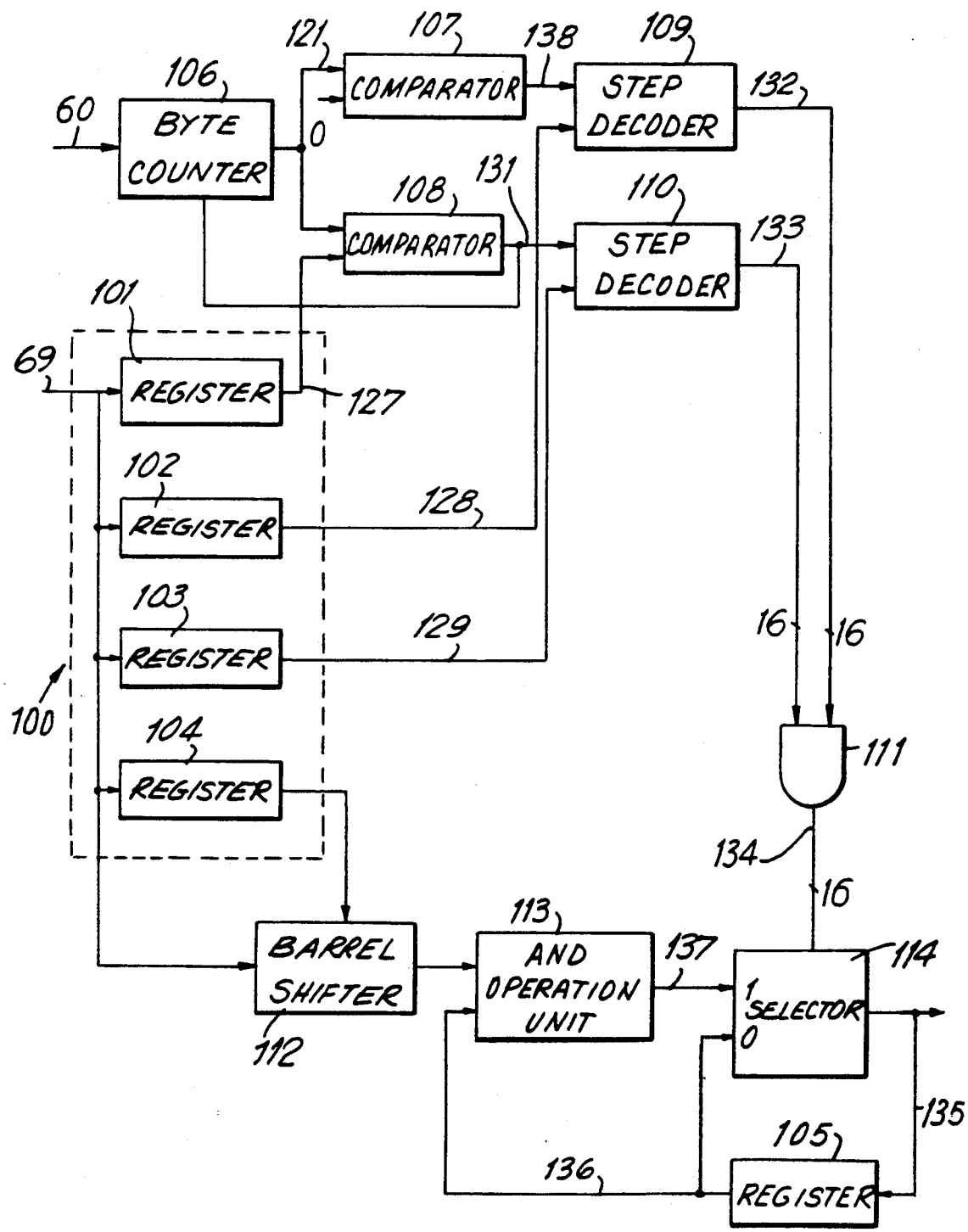
FIG. 7 is a block diagram of a masking circuit constructed in accordance with the invention.
Figure 10:
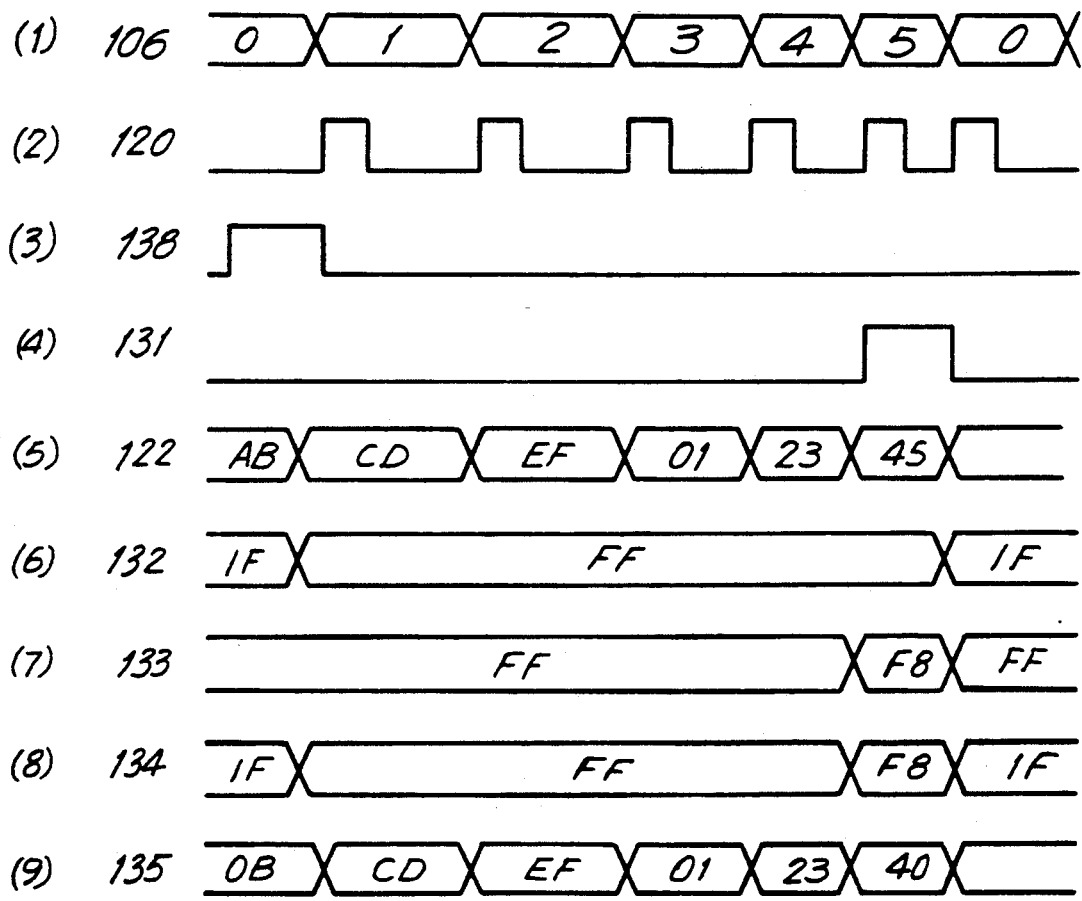
FIG. 10 is a timing chart for the operation of the apparatus in accordance with the invention.

Reference is now made to FIGS. 7 and 10 in which a masking circuit for use in connection with the memory device of the present invention and the timing chart therefor are provided. The masking circuit includes a plurality of registers, generally indicated as 100, each receiving an input from data bus 69 and including a first register 101 which sets a bit number for continuously producing signals 127 ("0") from the side of the most significant bit (MSB) to the side of the least significant bit (LSB) of the data change in the data of one byte stored in the work region of memory 57. A register 102 of the plurality of registers 100 sets the mask quantity, in terms of a bit number, of the left end side in the image data and a register 103 of registers 100 sets the mask quantity in terms of a bit number, of the right end side of the image data. Five transfer bytes are input to register 101. Three bits of the left side mask width are input to register 102. Four bits of the right side mask width are input to register 103 and a zero shift quantity is input to a register 104 of registers 100. A byte counter 106 receives an input from address bus 60 and is set to zero in an initial condition. Counter 106 counts the amount of data transfer in bytes from work region 91 of memory 57. A comparator 107 receives the count as a signal 138 from byte counter 106 and a reference value "0". Comparator circuit 107 produces a signal 138 ("1") when the reference value corresponds to the counted value of counter 106. For purposes of explanation, comparator circuit 107 produces a signal "1" because the reference value corresponds with the counted value of counter 106. A first step decoder 109 receives signal 138 and operates when signal 138 has a value "1" and produces an 8 bit length data that stepwise increases from the MSB side towards the LSB side corresponding to set point values of register 102 (shown in FIG. 8) output as signal 128. When not in operation, first step decoder 109 produces an output "11111111".

In the present example, a mask quantity of "3" has been input to register 102 and first step decoder 109 produces an output "00011111".

A comparator circuit 108 also receives the output 121 of byte counter 106 and compares it with signal 127 produced by register 101. Comparator circuit 108 produces an output 131 of "1" when the two inputs coincide. In this example, the two inputs do not coincide and signal 131 has a value of "0". A second step decoder 110 operates when signal 131 has a value "1" and produces an 8 bit length of data that stepwise increases from the LSB side toward the MSB side in accordance with set point values output as 129 of register 103 as shown in FIG. 9. When second step decoder 110 is not in operation, the output 133 is "11111111". When such an output is produced, the count content of counter 106 is not in agreement with the data of register 101. Therefore, second step decoder 110 does not operate and produces a signal 133 of "11111111".

An AND gate 111 receives signal 132 and 133 as inputs from step decoder 109 and step decoder 110 respectively and produces an output 134. In the present example, output 134 has the value "00011111" which is signal 132 output by step decoder 109.

A selector 114 receives signal 134 produced by AND gate 111 and produces an output 135. A register 105 receives signal 135 as an input and produces an output signal 136 which is input to selector 114 as a "0" value input and to an AND operation unit 113.

AND operation unit 113 also receives an input from a barrel shifter 112. Barrel shifter 112 receives an input from data bus 69 which is the value to be shifted. Barrel shifter 112 also receives an input from register 104 corresponding to the shift value. Barrel shifter 112 outputs a value which is shifted from the input value of data bus 69 by the input value of register 104 which in the example caused AND operation unit 113 to produce an output signal 137 which is input to selector 114 as a "1" input.

Selector 114 receives signal 134 from AND gate 111 which causes AND operation unit 113 to produce outputs for each signal position of signal 134 having a bit value "1" and image data stored in register 105 to be produced for each data position within signal 134 which corresponds to a signal "0". In this example, because AND gate 111 produces a data signal 134 having the value "00011111", selector 114 produces the data stored in register 105 for the first three bits of the signal and produces a signal from AND circuit 111 for the last five bits.

As the first byte is processed and the data of a second byte is then input, the count of counter 106 is increased by 1. Therefore, first comparator circuit 107 and second comparator circuit 108 produce respective signals 138, 131 having a "0" value. Both first and second step decoders 109 and 110 become inoperative producing signals 132 and 133 having a value of "11111111". AND gate 111 produces a signal 134 "1" for all the bits of each byte and selector 114 selects the output of AND operation circuit 113 and sends it to image data processing region 91 of memory 57. When processing is finished for the second byte, the count value of counter 106 is again incremented by 1 and the above steps are repeated.

Comparator circuits 107 and 108 produce "0" values up to and including the fifth byte being processed so that the selector 114 produces signal 134 of AND gate 111 and therefore produces the signal of data bus 69. Since the data of data bus 69 is directly produced from the second byte to the fifth byte, no masking takes place. Once processing is completed through the fifth byte, the count value of counter 106 becomes 5 which coincides with the set point value of register 101 causing comparator circuit 108 to produce a signal 131 "0". Second step decoder 110 produces a mask pattern "11111100" selected corresponding to a value input to register 103. Selector 114 then selectively produces data of the first 6 bits of data bus 69 and selectively produces the data of register 105 for the last two bits.

Due to the masking as discussed above, the data of each line is converted. Specifically, the first byte is converted into "10101011" (AB in hexadecimal notation) and "00001011" (0B in hexadecimal notation). The second byte "11001101" (CD in hexadecimal notation), the third byte "11101111" (EF in hexadecimal notation), the fourth byte "00000001" (01 in hexadecimal notation) and the fifth byte "00100011" (23 in hexadecimal notation) are not converted. The sixth byte "01000101" (45 in hexadecimal notation) is converted into "01000000". As a result, a blank of three bits is formed at the right end and left end. The above operation is repeated for each line of data present.

The data can then be written into the image data processing region simultaneously with reading data from the work region of memory 57 while executing the remasking. Therefore, no work time is required to be wasted by the CPU and the masking process and the data process are carried out at high speeds.

By providing a CPU for processing print data in conjunction with a one port RAM acting as a main memory for the CPU, first and second memory means the received data corresponding to head address and tail address from the CPU, first and second memory circuits that receive head address data and tail address data from a data bus coupled to the CPU, a first comparator and a second comparator that compares the head address data and tail address data input to the first memory circuit and second memory circuit with address data transmitted along an address bus to the comparators and a circuit for accessing either a first region specified by the head address and tail address or another region within the memory in response to a signal from the comparators, a single one port memory may be utilized for both the work region and image processing region. This allows the memory to be flexibly used for both the work region and the image data region providing greater efficiency. Furthermore, by including circuitry for transmitting the data of the data bus to a parallel to series converter in synchronism with the image data read signal being produced by the CPU, the image data is sent to the parallel to series converter directly from the CPU without having to pass through write steps allowing the image data to be read a high speed.

It will thus be seen that the objects set forth above, among those made apparent from the preceding description, are efficiently attained and, since certain changes may be made in the construction set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed:

1. A memory device utilized with a page printer for storing print data comprising a CPU for processing the print data and producing address data, a left side mask width, right side mask width, a zero shift quantity and a plurality of transfer bytes, font memory means directly coupled to said CPU for storing character pattern data, a one port random access memory for storing an image data and having at least a first memory region and an other memory region therein, and accessing means for receiving said address data, transfer bytes, left mask width, right mask width and zero shift quantity and masking the image data to be written into the first region of said one port random access memory in response thereto.

2. The memory device of claim 1, wherein the first memory region is an image processing region.

3. The memory device of claim 2, wherein the image processing region is further sub-divided into two distinct sub-regions 4. The memory device of claim 1, wherein said other memory region is a work region.

5. The memory device of claim 1, wherein said accessing means accesses said first region if said data signal is not masked and accessing said other region if said data is masked.

* * * * *